United States Patent [19]
Zafiroglu

[11] Patent Number: 5,635,271
[45] Date of Patent: *Jun. 3, 1997

[54] SHAPED ARTICLE WITH THERMOFORMED COMPOSITE SHEET

[75] Inventor: Dimitri P. Zafiroglu, Greenveille, Del.

[73] Assignee: E. I. Du Pont de Nemours and Company, Wilmington, Del.

[*] Notice: The term of this patent shall not extend beyond the expiration date of Pat. No. 5,075,142.

[21] Appl. No.: 193,007

[22] PCT Filed: Aug. 20, 1991

[86] PCT No.: PCT/US91/05913

§ 371 Date: Sep. 2, 1994

§ 102(e) Date: Sep. 2, 1994

[87] PCT Pub. No.: WO93/03916

PCT Pub. Date: Mar. 4, 1993

Related U.S. Application Data

[63] Continuation-in-part of Ser. No. 481,221, Feb. 20, 1990, Pat. No. 5,075,142.

[51] Int. Cl.$^6$ ............................................. B32B 3/26
[52] U.S. Cl. ..................... 428/102; 264/45.3; 264/46.4; 428/309.9; 428/314.4; 428/319.7; 442/315; 442/326; 442/370
[58] Field of Search ................... 428/309.9, 314.4, 428/319.7, 102, 230; 264/46.4, 45.3

[56] References Cited

U.S. PATENT DOCUMENTS

| | | | |
|---|---|---|---|
| 4,130,614 | 12/1978 | Saidla | 264/46.4 |
| 4,379,103 | 4/1983 | Doerfling | 428/36.1 |
| 4,753,837 | 6/1988 | Hanusa | 428/86 |
| 5,075,142 | 12/1991 | Zafiroglu | 428/36.1 |

FOREIGN PATENT DOCUMENTS

| | | |
|---|---|---|
| 0211495 | 2/1987 | European Pat. Off. . |
| 0433541 | 8/1991 | European Pat. Off. . |
| 1901828 | 8/1970 | Germany . |
| 3043044 | 6/1982 | Germany . |
| 1415852 | 11/1975 | United Kingdom . |

OTHER PUBLICATIONS

Database WPI Week 8738, Derwent Publication AN87-267016 & JRA-62 184 815 (Okamura Seisakusho).

*Primary Examiner*—Nasser Ahmad

[57] ABSTRACT

An improved shaped article comprising a thermoformed composite sheet, which is a layer of thermoplastic polymer attached to a surface of a lightweight conformable fabric, the other surface of the fabric being attached to a layer of rigid foam, provides the article with improved wall thickness uniformity and impact resistance.

4 Claims, 1 Drawing Sheet

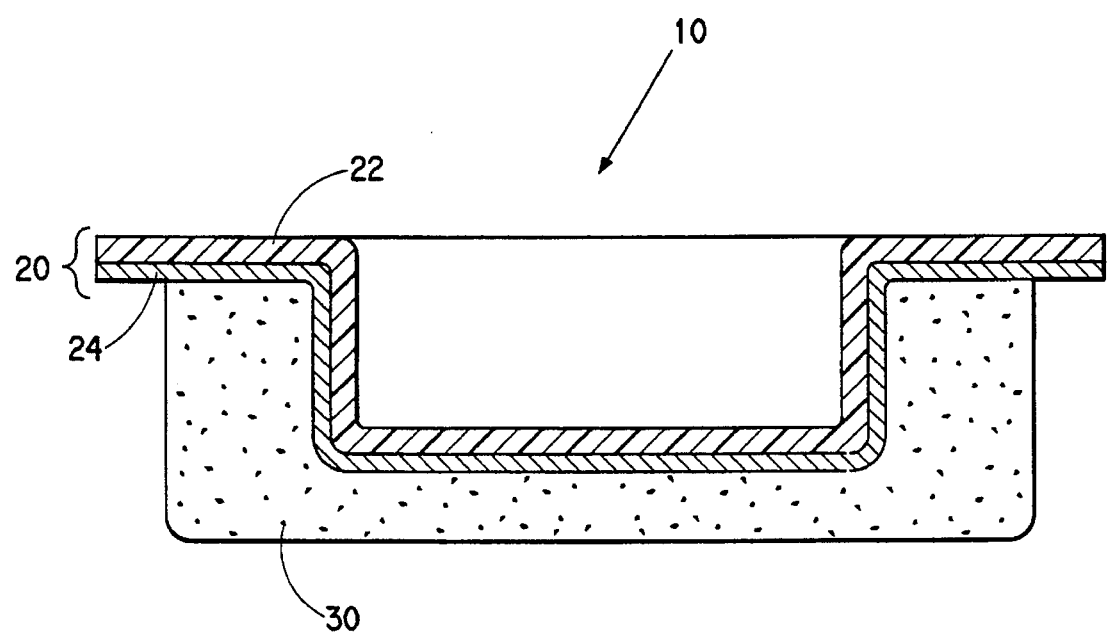

5,635,271

SHAPED ARTICLE WITH THERMOFORMED COMPOSITE SHEET

RELATED APPLICATION

This is a continuation-in-part of application Ser. No. 481,221, filed Feb. 20, 1990, now U.S. Pat. No. 5,075,142.

BACKGROUND OF THE INVENTION

1. Field of the Invention

This invention relates to a shaped article comprising a thermoformed composite sheet having an outer surface layer of thermoplastic polymer attached to a surface of a conformable fabric layer. In particular, the invention concerns such a shaped article in which the other surface of the fabric layer of the composite sheet is attached to a layer of rigid foam.

2. Description of the Prior Art

Conventional thermoforming processes are described by Lubin, "Handbook of Composites", Van Nostrand Reinhold Company, 1982, pages 366–367. Such processes generally involve sequential steps of (a) heating a thermoplastic sheet until it softens, (b) forming the softened sheet in a mold and (c) allowing the formed sheet to cool and harden. When thermoforming is used to mold a thermoplastic sheet into a large article, such as the interior surface of a bathtub, sink, canoe hull, or the like, the sheet undergoes a large increase in area, often by a factor of three or more, along with a corresponding decrease in thickness. However, during thermoforming, regions of the thermoplastic sheet that are subjected to large changes in area and/or contour (e.g., in corners and edges of the shaped article) often suffer from excessive and nonuniform thinning, which in turn leads to lower impact resistance and greater fragility. To compensate for such undesired thinning thinning, extra reinforcement to such regions is provided by using a much thicker starting thermoplastic sheet for the thermoforming. This results in a heavier and more expensive molded article.

Composite sheets comprising thermoplastic sheets laminated to a fabric layer are known for use in thermoforming processes. Although such materials may have been useful in thermoforming, improvements in the formed product are desired, particularly in minimizing thinning of the formed walls and in increasing the impact resistance of the exposed plastic surface.

To alleviate the wall-thinning problems associated with thermoforming of large articles, the present inventor found that considerable improvements in wall uniformity can be achieved by using a thermoformable composite sheet having a layer of thermoplastic polymer adhered to a relatively light, conformable, nonwoven fibrous layer stitchbonded with an elastic thread, which fabric amounts to no more than 20% of the total weight of the composite sheet. Although these composite sheets reduce undesired thinning during thermoforming, the utility of shaped articles formed therewith would be further enhanced if the articles also had improved resistance to cracking under impact. Accordingly, it is an object of this invention to provide increased impact resistance to such thermoformed shaped articles.

SUMMARY OF THE INVENTION

The present invention provides an improved thermoformed shaped article. The article is of the type that includes a thermoformed composite sheet that has an outer surface of thermoplastic polymer attached to a first surface of a relatively lightweight conformable fabric layer. In accordance with the improvement of the present invention, the composite sheet has a thermoformed expansion factor of at least 1.5, preferably greater than 2, and most preferably in the range 3 to 7, the conformable fabric amounts to no more than 20%, preferably 5 to 15%, of the weight of the thermoplastic layer and the surface of the fabric opposite the first surface is attached to a layer of rigid foam having a specific volume in the range of 3 to 30 $cm^3$/gram and a thickness of at least 2.5 cm. Preferably, the composite sheet is made with a fabric layer having a specific volume of at least 5 $cm^3$/gram, a weight in the range of 100 to 500 $g/m^2$ and a conformability at 180° C. (defined hereinafter) in the range of 2 to 9, most preferably 4 to 7. Preferred thermoplastic layers are of methylmethacrylate homopolymers and copolymers. Preferred fabric layers are selected from nonwoven fabrics stitchbonded with elastic threads, needled felts and knitted fabrics. Preferred foams are in-situ generated rigid foams, particularly rigid foams of polyurethane polymer.

BRIEF DESCRIPTION OF THE DRAWING

The invention will be better understood by referring to the drawing, which is a cross-section of a shaped article of the invention 10, having a thermoformed composite sheet 20 comprising thermoplastic polymer layer 22 adhered to conformable fabric 24 which in turn is adhered to rigid foam layer 30.

DETAILED DESCRIPTION OF PREFERRED EMBODIMENTS

As illustrated in the drawing, the improved shaped article 10 of the invention comprises a thermoformed composite sheet 20 having an outer surface layer 22 of thermoplastic polymer attached to a conformable fabric layer 24, which fabric is in turn adhered to a rigid polymeric foam layer 30. The composite is capable of being thermoformed by being heated to temperatures at which the thermoplastic polymer softens and then having pressure applied, as in compression molding or vacuum molding. With the application of pressure during the thermoforming, the conformable fabric 24 with the softened thermoplastic layer 22 adhered thereto conforms to the contours of the mold. The presence of the fabric in the composite apparently decreases the nonuniform thinning that usually occurs in the thermoplastic layer if there is no fabric present. In thermoforming operations, the thickness of the thermoplastic polymer layer of the composite sheet is greatly decreased and the area of the polymer layer is greatly expanded. Area expansion factors (E, defined hereinafter) of at least 1.5 are common. The advantages of the invention become greater with E of at least 2, and especially with E in the range of 3 to 6, or greater.

In accordance with the invention, the thusly thermoformed composite sheet 20 is then placed in another mold. The sides of the mold and the composite sheet are sealed to each other to form a cavity in between the walls of the mold and the fabric layer 24 of the thermoformed composite sheet 20. A polymeric material and foaming agent are then introduced into the cavity. The polymer and agent react to form rigid foamed polymeric layer 30 in situ and to simultaneously attach or adhere foam layer 30 to fabric layer 24.

Conventional thermoplastic polymers are suitable for the polymer layer of the thermoformable composite sheet, provided the molding temperature of the polymer is also suitable for the conformable fabric. Among suitable thermoplastic polymers are homopolymers and copolymers of methylmethacrylate, certain polyolefins (e.g., polyethylene, polypropylene), polyvinyl and polyvinylidene halides, ABS resins, polycarbonates, and the like. Methylmethacrylate homopolymers and copolymers are preferred.

A temporary or permanent adhesive can be used to adhere the stitchbonded nonwoven elastic fabric to the thermoplastic polymer layer. For example, 68070 Tedlar® adhesive (made by E. I. du Pont de Nemours and Company) is suitable. Alternatively, adhesion can be achieved by thermal bonding. The thermoplastic polymer layer and the conformable fabric can be adhered to each other most economically immediately after the thermoplastic polymer has been cast or extruded into a sheet by bringing the fabric into firm contact with the sheet while the sheet is still hot.

The lightweight conformable fabric of the thermoformable composite sheet can be selected from wide range of fibrous materials and a wide range of weights. Compared to the thermoplastic layer, the fabric is of very light weight and high bulk (i.e., low density, high specific volume). The fabric usually weighs in the range of 100 to 500 g/m$^2$ (3 to 15 oz/yd$^2$), preferably 120 to 240 g/m$^2$ (3.5 to 7 oz/yd$^2$), has a bulk of at least 5 cm$^3$/g, and amounts to no more than 20%, preferably 5 to 15%, of the total weight of the composite sheet. In contrast, the thermoplastic polymer layer often can weigh 5 to 40 times as much as the fabric and can have a specific volume of less than 1 cm$^3$/g.

The fabric layer of the thermoformable composite sheet intended for use in the present invention generally has a Conformability, C, at 180° C. in the range of 2 to 9, preferably in the range of 4 to 7. Conformability is measured as described hereinafter.

Conformable fabrics for use in thermoformable composite sheets of the present invention can increase in area quite uniformly by a factor of 2 to 9. The fabric prevents excessive thinning of the thermoplastic layer in the usual problem regions at corners and edges of the shaped article. When the conformable fabric has a Conformability at 180° C. outside the stated range, the resultant thermoformed article, if deep molded, has inadequate thickness at its corners and edges. Several types of fabrics can be used as conformable fabrics suitable for use in the present invention (i.e., those whose conformability factor at 180° C. measure in the range of 2 to 9). Among these are certain stitchbonded nonwoven fabrics, needled felts, knitted fabrics and the like.

Especially preferred conformable fabrics suited for the thermoformable composite sheet for use in the present are the stitchbonded nonwoven elastic fabrics disclosed in the present inventor's U.S. Pat. No. 4,773,238. Such stitchbonded fabric are much more conformable than the thermoplastic polymer layer at room temperature. At the temperatures of thermoforming, the stitchbonded elastic fabric develops a much higher resistance to stretch and flow than does the thermoplastic sheet to which it is adhered. It is believed that this large resistance (compared to that of the thermoplastic polymer layer) causes the thermoplastic polymer layer to distribute itself more uniformly in the mold, thereby decreasing thinning in the resultant shaped article. Other types of fabrics having a conformability at 180° C. are believed to function in the same manner.

Various starting materials are suitable for preparing the preferred stitchbonded nonwoven elastic fabric for the thermoformable composite sheet. The starting materials usually are bulky, lightly bonded or nonbonded batts or webs of natural or synthetic organic fibers. Carded fiber batts, air-laid batts, lightly bonded spunbonded sheets, sheets of hydraulically entangled fibers, and the like are suitable.

To form the fabric layer of the composite sheet, the above-described starting materials can be stitchbonded by conventional techniques with multi-needle stitching equipment. Substantially any strong elastic thread is suitable for the stitching thread. However, if the elastic thread has a softening or melting point that is lower than the softening temperature of the thermoplastic polymer layer to which the elastic fabric is to be adhered, the thread should be present in the form of a covered or wrapped yarn. Suitable yarns include spandex or rubber filaments covered or wrapped with yarns of glass, aramid, nylon, polyester or the like. Then, even if the spandex or rubber softens or melts during thermoforming, the cover or wrap yarn persists and apparently provides the forces needed to decrease excessive thinning during thermoforming. Preferred stitching yarns are made of spandex filaments covered with nylon or polyester yarns. Stretch-textured nylon or polyester yarns also are suitable. Usually the stitching thread amounts to no more than 20% of the weight of the stitchbonded fabric, but preferably no more than 10%, most preferably 2 to 5%.

Many stitch patterns can be employed in the stitchbonding of the starting materials. Typically, a series of interlocked loops is formed in one surface of a staple fiber batt and a parallel series of zigzag stitches is formed on the other surface. Alternatively, the stitching can form rows of chain stitches along the length of the batt. Chain stitching with elastic yarns can decrease the fabric length in the direction of the row of stitches and zigzag stitches can decrease the width as well as the length of the fabric. Usually, the rows of stitches are inserted by needles which have a spacing in the range of 2 to 8 needles per cm and within each row, the stitches usually have a spacing of 1 to 7 per cm. Zigzag stitches are preferred. If the batt is stitched with elastic thread that is under tension, and the tension is then released, the fabric area becomes smaller (i.e., shrinks). Shrinking of the stitchbonded fabric can also be accomplished by heating, steaming or chemical treatment.

To be suitable for use in the thermoformable composite sheets of the invention, the starting fabric generally has must have a Conformability at 180° C. in the range of 2 to 9. Within this range, the Conformability of the fabric is sufficiently large to accommodate the usual area increase required of the thermoplastic layer during the thermoforming step. Also, even though the composite sheets of the invention significantly improve the thickness uniformity of thermoplastic polymer in the finished shaped article, considerable thickness variation can still be present. Accordingly, for use in making composite sheet of the invention, a good rule of thumb is to select a conformable fabric that has a Conformability equal to at least one-and-a-half times the average area increase expected in conforming the composite sheet to the mold.

In the Examples below, other fabrics, such as felted and knitted fabrics having conformabilities in the desired range are shown to perform in the thermoformable composite sheet very similarly to the stitchbonded elastic fabrics.

When the fabric of the composite sheet is colored or dyed and the thermoplastic layer is clear, special interesting visual effects can be obtained in the final shaped article.

Thermoformed composite sheet, prepared as described above, is attached to a rigid polymeric foam to complete the shaped article of the invention. The foamed polymer layer improves the impact and cracking resistance of the thermoplastic surface of the shaped article. The foamed layer also provides additional stiffness and strength to the article without excessively increasing weight. A wide variety of rigid foams can be used in the shaped article of the present invention. Generally, suitable foams have a bulk (i.e., specific volume) in the range of 3 to 30 cm³/gram, a thickness of at least 2.5 cm and can adhere readily to the conformable fabric of the thermoformed composite sheet. Suitable rigid polymeric foams include polyurethanes, polystyrenes and the like. Polyurethane foams that can be formed in situ in a mold are preferred.

To assure good adhesion or attachment of the conformable fabric to the thermoplastic plastic layer of the thermoformable composite sheet and to the foamed layer, whether adhesives and/or thermal bonding is employed, the fabric should have a somewhat bulky or open structure. The Examples below illustrate such fabrics. It is believed that even a tightly constructed fabric of good conformability can be made to adhere satisfactorily to the other layers of the shaped article, if the fabric surfaces are sanded or napped.

Test Procedures

Conformability, C, of a fabric is measured in accordance with the following procedure. A sample of the fabric is mounted flat in a 20.3-cm (8-inch) diameter ring that weighs 11.4 kilograms (25 pounds). A 5.1-cm (2-inch) diameter circle is marked in the center of the top surface of the fabric. A smooth metal sphere of 15.3-cm (6-inch) diameter is dusted with talc (to avoid sticking of fabric to the sphere). The fabric, held in the ring, is centered atop the sphere. The weight of the ring is supported by the fabric atop the sphere. The thusly weighted fabric assembly is placed in a hot air oven and heated at 180° C. for five minutes during which time the fabric expands to conform, at least in part, to the spherical surface. After the fabric is removed from the oven and allowed to cool, the fabric is removed from the ring and the expanded diameter, D, of the originally marked circle is re-measured. The new diameter results from the expansion caused by the heating and the stress imposed by the weight of the ring. The Conformability at 180° C. is then calculated by the formula $$C = (D2/5.1^2) = 0.0384 D^2.$$

By repeating this procedure, but with the heating step omitted, the room temperature (i.e., 20° C.) Conformability is measured.

Expansion Factor, E, is a dimensionless parameter used to characterize the area increase that ideally would be required if a flat thermoplastic sheet were to conform to the walls of a mold while undergoing a uniform change in sheet thickness. For example, the factor E is calculated for a rectangular molding operation by the formula $$E = (LW + 2LH + 2WH)/LW.$$

where L, H and W are respectively defined as the length, height and width of the internal dimensions of the mold. Wall thicknesses reported in the Examples below are for the thermoplastic layers only; fabric thickness is not included. Thicknesses are measured at "critical" regions of the thermoformed part with an ultrasonic thickness tester, sold by Branson Co. "Critical" regions are those wherein excessive thinning of the thermoplastic polymer usually is difficult to avoid. The reported thicknesses are averages measured (a) at the four bottom corners, (b) at the midpoints of the long and short bottom edges, (c) at the middle of the bottom face of the molded article and (d) at points on a "lip" portion of the molded composite (i.e., a lip portion that formed at the top of the molded plastic/fabric composite, which portion was not deformed). The "ideal", or desired thickness, $t_i$, is defined as the thermoplastic polymer layer thickness, $Z_o$, before thermoforming divided by the expansion factor, E, of the mold. Thus, $t_i = Z_o/E$.

The local specific volume (or bulk), B, of the fabric of the thermoformed composite layer after thermoforming, in cm³/gram, was calculated by the following formula:

$$B = \frac{10,000(T - Z_f)}{W(Z_f/Z_o)}$$

wherein

T = the total local thickness of the thermoformed composite layer in cm,

W = the initial weight of the fabric before molding in grams/square meter, $Z_f$ = the local thickness of the thermoplastic layer after thermoforming (measured as described in the preceding paragraph) in cm, and $Z_o$ = the initial thickness of the thermoplastic layer of the composite before thermoforming in cm.

T, the total local thickness after thermoforming is measured with a thickness gauge that applies a pressure of 10 grams/cm² on the fabric face of the thermoformed composite. The local thickness of the fabric then is calculated as $(T - Z_f)$, the difference between the total local thickness, T, and the ultrasonically measured thickness of the molded thermoplastic layer, $Z_f$.

The resistance to impact-induced cracking of the thermoplastic layer of a shaped article is determined by measuring the vertical height from which a 12-ounce (340-g) steel weight having of a ¼-inch (0.64-cm) diameter hemispherical impact surface must be dropped onto the thermoplastic surface to cause cracking of that surface. The test is started with an initial drop height of 1 inch (2.54 cm) above the thermoplastic surface. The height of each successive drop is increased in one-inch (2.54-cm) until the impact of the dropped weight cracks the surface of the thermoplastic layer. As recorded herein, the impact resistance is equal to the height from which the weight was dropped that caused a crack is found in the thermoplastic surface. All tests were performed at locations where the thickness of the shaped article had been measured.

EXAMPLES

The following examples illustrate the invention. The results reported herein are believed to be typical, but do not constitute all the runs performed. In the Examples, Tables and Figures, samples of the invention are identified with Arabic numerals; those with upper-case letters are comparison samples outside the invention.

Example 1 shows the significant reduction in wall-thickness thinning that advantageously occurs when one thermoforms a preferred composite sheet in accordance with the invention. Example 2 illustrates the production of shaped articles of the invention having different types of fabrics in the composite and demonstrates their advantages in imparting impact resistance to the articles. In each example, a sample outside the invention sample is thermoformed under the same conditions as the sample of the invention for comparison with the sample of the invention.

EXAMPLE 1

This example illustrates the advantageous reduction in excessive wall thinning that results from use of a composite sheet made according to the invention. The advantage is demonstrated with a composite sheet that is a layer of polymethylmethacrylate (PMMA) adhered to a stitchbonded nonwoven elastic fabric.

The stitchbonded fabric was prepared with a 14-gauge (14 needles/inch or 5.5/cm in the cross-machine direction) two-bar Liba stitching machine, which inserted 11.5 stitches/inch (4.5/cm) in the machine direction. A stitching yarn (sold by MacField Texturing Inc., Madison, North Carolina) of 22-dtex (20-denier) Type-126 Lycra® spandex (sold by E. I. du Pont de Nemours and Company) that was single-wrapped with 44-dtex (40-den) 13-filament textured nylon yarn formed repeating stitch patterns of 1-0,0-1 chain stitches with the front bar and 1-0,2-3 "long float" jersey stitches with the back bar in a fibrous layer of Sontara® Type 8000 spunlaced web (sold by E. I. du Pont de Nemours and Company) which was composed of hydraulically entangled 1.5-dtex (1.35 den), 3.8-cm (1.5-inch) long polyester staple fibers. (Stitches are identified by conventional warp-knitting stitch notation.)

A sample of the thusly prepared stitchbonded fabric was immersed in boiling water for 10 minutes and then air dried. The fabric shrank in the longitudinal direction to about 70% of its original length and in the transverse direction to about 40% of its original width. The resulting fabric had grab tensile elongations at break (ASTM D 1117) of about 162% and 365%, in the longitudinal and transverse directions, respectively. The thusly prepared fabric had a Conformability of 5.6 at room temperature and of 6.1 at 180° C.

A sample of the shrunken fabric was adhered at 150° C. with G-8070 Tedlar® adhesive to a 61-cm (24-inch) long, 41-cm (16-inch) wide, 0.318-cm (0.12-inch) thick, Lucite® polymethylmethacrylate (PMMA) thermoplastic polymer. (Tedlar® and Lucite® are sold by E. I. du Pont de Nemours and Company). The resulting composite was 95.7% by weight PMMA layer and 4.3% by weight fabric, not counting the adhesive which weighed less than 6.8 g/m² (0.2 oz/yd²). In total, the composite weighed more than 4.5 kg/m² (10 lb/yd²).

The thusly prepared composite (Sample 1) was heated in an oven at 180° C. for 10 minutes and then promptly vacuum molded, with the fabric surface of the composite facing the mold walls. A comparison article, Sample A, was thermoformed with a PMMA sheet of the same size and weight as in the composite of Sample 1, but with no fabric adhered to it. The mold had a cavity that measured 28 cm long, 22 cm in wide, 15 cm deep and 3.50 in expansion factor. Results are summarized in Table 1.

TABLE 1

| | Example 1 | |
|---|---|---|
| Samples | Comparison A | Invention Sample 1 |
| Stitchbonded Fabric | | |
| Weight, g/m² | none | 193 |
| % of Composite | — | 4.3 |
| Conformability | | |
| at 20° C. | — | 5.6 |
| at 180° C. | — | 6.1 |
| PMMA Thickness, mm | | |
| Ideal, t$_i$ | 0.91 | 0.91 |
| Corners | 0.20 | 0.74 |
| Edges | 0.51 | 0.84 |
| Mid bottom | 0.53 | 0.94 |

As can be seen from Table 1, the ideal thickness, t$_i$, for the PMMA layer was 0.91 millimeters (0.036 inch). The thicknesses in the "critical" regions at the corners, edges, and mid-bottom of the thermoformed comparison Sample A were respectively only 22, 56 and 58% of the desired ideal thickness. This reflects highly excessive and uneven thinning of the thermoplastic PMMA layer in those regions. In contrast, the thickness in the same "critical" regions of the thermoformed composite Sample 1 of the invention, were 81, 92 and 103% of the ideal thickness. The composite in accordance with the invention with its stitchbonded nonwoven elastic fabric produced a much more uniform and desirable thinning of the walls in the critical regions of the thermoformed article.

The thermoformed composite sheet of Sample 1 was treated further to attach it to a rigid foam. The thermoformed sample was placed in a plywood box having an open top and internal dimensions that were about two inches (5 cm) larger than the outside dimensions of the thermoformed article so that there was a clearance of about 1 inch (2.5 cm) between the outer surface of the article and the inside of the box. A urethane foam was injected in the clearance space between the box walls and fabric surface of the thermoformed article. After curing and removal of the shaped article from the box, the foam was found to be permanently attached to the thermoformed composite. The rigid foam provided additional strength and impact resistance to the article at a very small cost and very small increase in total weight.

EXAMPLE 2

This example 2 illustrates the production of shaped articles of the invention having different types of fabrics in the composite and demonstrates their advantages in impact resistance and thickness control over samples outside the invention.

For each sample of the invention, Samples 2, 3 and 4, (a) a fabric is prepared, (b) the fabric is adhered to a layer of polymethylmethacrylate (PMMA) to form a composite sheet, (c) the composite sheet is heated and then thermoformed in a test mold, and (d) the thermoformed composite is attached to a rigid foam. A Comparison Sample is prepared for each thermoformed composite sheet sample of the invention (Comparison Samples B, C and D, respectively). Each comparison sample is thermoformed under the same conditions as the sample of the invention, but the comparison sample has no fabric adhered to the PMMA layer.

In making each of the samples of the invention and comparison samples, a PMMA layer of 0.292 cm (0.115 inch) was used with each of three different fabrics.

The fabric of Sample 2 was of the same construction as the elastic stitchbonded nonwoven fabric of Sample 1 of Example 1. The stitchbonded fabric weighed 185 g/m² (5.5 oz/yd²), had a conformability at 20° C. of 6.3, a conformability at 180° C. of 7.8, a thickness of 0.198 cm and a bulk of 10.7 cm³/g.

The fabric of Sample 3 was a 138-g/m² (4.0-oz/yd²) felt, produced by carding and cross-lapping polyester staple fibers of 3.3 dtex (3 den) and 7.6-cm (3-inch) length into a batt weighing 102 g/m² (3 oz/yd²) and then needling the batt with a Dilo needler at 38.8 penetrations/cm² (250 penetrations/in²). The felted fabric had a conformability at 20° C. of 2.0, a conformability at 180° C. of 2.9, a thickness of 0.295 cm and a bulk of 21.3 cm³/g.

The fabric of Sample 4 was an 18-gauge, 7.1 courses/cm (18/inch), circular knit fabric made with 550 dtex (500 den) wool yarn. The knit fabric weighed 155 g/m² (4.6 oz/yd²) and had a conformability at 20° C. of 2.2, a conformability at 180° C. of 3.0, a thickness of 0.283 cm and a bulk of 18.3 cm³/g.

To adhere each fabric to the PMMA layer, the PMMA layer was first coated with a thin layer of a solvent adhesive (Weld-ON 16® made by Industrial Polychemical Service of Gardenia, Calif.). The sample fabric was then laid on the coated surface. The fabric and PMMA layers were held together under light pressure for 5 to 10 minutes and then allowed to cure for 24 hours before subsequent thermoforming. The adhesive composition was about 10% synthetic acrylic resin, 45% methylene chloride and 45% methyl ethyl ketone.

Thermoforming was performed by preheating the sample in an oven heated to 180° C. for 15 minutes and then forming the sample under vacuum, as in Example 1, in a mold having a cavity of 15.2-cm (6-inch) length, 15.2-cm width, 7.6-cm (3-in) depth and about 4.0 expansion factor. After thermoforming, determinations were made of the thickness of the thermoplastic layer, of the total thickness, of the weight of the fabric and of the bulk of the fabric in four different locations of the thermoformed composite; namely at the midpoint of the bottom of the formed composite, at 2.54 cm from the top and 2.54 cm from the bottom along the vertical mid-lines of the sides of the formed composite and along the flat lid of the formed composite. The results of these measurements are summarized below in Table 2.

TABLE 2

Example 2
Thermoformed Composites

| Sample of Invention | 2 | 3 | 4 |
|---|---|---|---|
| Fabric | Stitch-bonded | Felt | Circular Knit |
| Measurement Location | | | |
| Mid bottom | | | |
| $Z_f$, plastic thickness, cm | 0.072 | 0.114 | 0.109 |
| T, total thickness, cm | 0.106 | 0.193 | 0.172 |
| B, fabric bulk, cm³/g | 7.5 | 14.7 | 10.8 |
| w, fabric weight, g/m² | 46 | 54 | 58 |
| Mid side 2.5 cm from bottom | | | |
| $Z_f$, plastic thickness, cm | 0.122 | 0.128 | 0.135 |
| T, total thickness, cm | 0.181 | 0.235 | 0.205 |
| B, fabric bulk, cm³/g | 7.6 | 17.7 | 9.8 |
| w, fabric weight, g/m² | 77 | 61 | 72 |
| Mid side 2.5 cm from top | | | |
| $Z_f$, plastic thickness, cm | 0.210 | 0.200 | 0.232 |
| T, total thickness, cm | 0.356 | 0.325 | 0.440 |
| B, fabric bulk, cm³/g | 11.0 | 13.2 | 16.9 |
| w, fabric weight, g/m² | 133 | 95 | 123 |
| Lid | | | |
| $Z_f$, plastic thickness, cm | 0.290 | 0.290 | 0.293 |
| T, total thickness, cm | 0.440 | 0.440 | 0.482 |
| B, fabric bulk, cm³/g | 8.1 | 10.9 | 8.3 |
| w, fabric weight, g/m² | 185 | 138 | 155 |

The results summarized in Table 2 show that the specific volume (bulk) of the fabric is decreased by lamination (note the measurements on the lid). Thermoforming generally does not significantly further decrease the fabric bulk. Note that the fabric bulk of these samples of the invention after thermoforming is still higher than 5 cm³/g. To assure that this bulk is exceeded, the initial bulk of the fabric generally is at least 8, preferably at least 10 cm³/g.

After thermoforming, the formed composite was adhered to a polyurethane foam by the same general procedure as described in Example 1. Vultafoam®, sold by General Latex and Chemical Corp. of Ashland, Ohio, was employed. Vultafoam® is a two-component system that forms a polyurethane foam. The first component is methylene-bis(4-phenylisocyanate) and some higher oligomers thereof which are reacted with the second component, a blend of polyols. The polyurethane was used to form a 5.1-cm (2-inch) thick rigid foam layer around each thermoformed composite. The foam density for each sample averaged about 0.11 g/cm³ (7 lb/ft³).

In addition to the shaped articles of the invention described above, comparison samples were also prepared without the foam layer (Samples B, C and D are comparison samples respectively for Samples of the invention 2, 3 and 4). Two further comparison samples were prepared, each with no fabric in the thermoforming, Sample E without foam (i.e., just a sheet of thermoformed plastic) and Sample F a thermoformed thermoplastic sheet having a foam layer (i.e., Sample E with a foam layer). The cracking resistance under impact was measured for each of these samples at locations of various thickness of the sample. The results of the measurements are summarized in Table 3, below.

Note that the foam provides little additional impact resistance (Comparison Samples E versus F) unless a fabric is included in the thermoformed structure. Even, without foam backing, the thermoformed structures having a fabric therein provided significant improvement over the thermoformed structures without fabric, with or without foam (Comparison Samples B, C and D versus E and F). However, a surprisingly large, apparently synergistic advantage in resistance to cracking is obtained when both the fabric and the rigid foam are present, as in the shaped articles of the invention (Samples 2, 3 and 4 versus Samples B, C and D).

TABLE 3

| | Impact Resistance of Shaped Articles Drop height in cm for Samples | | | | | | | |
|---|---|---|---|---|---|---|---|---|
| $Z_f$, cm | 2 | B | 3 | C | 4 | D | E | F |
| 0.06 | — | — | — | — | — | — | 3 | 2 |
| 0.08 | 15 | 8 | — | — | — | — | — | — |
| 0.10 | — | — | 71 | 33 | 36 | 15 | — | — |
| 0.15 | 36 | 15 | — | — | 81 | 28 | 10 | 8 |
| 0.18 | — | — | 122 | 51 | — | — | — | — |
| 0.23 | 97 | 46 | — | — | 91 | — | 18 | 18 |
| 0.29 | >180 | 71 | >180 | 130 | >180 | 76 | 33 | 41 |

Notes:
$Z_f$ = thickness of the thermoplastic layer
2, 3, 4, = Samples of the invention
B, C, D, E = Comparison samples with no foam layer
E, F = Comparison samples with no fabric layer

I claim:

1. A shaped article which comprises a thermoformed composite sheet that has an outer layer of thermoplastic polymer attached to a first surface of a relatively lightweight conformable fabric layer, characterized by the composite sheet having a thermoformed area expansion factor of at least 1.5, the conformable fabric amounting to no more than 20% of the weight of the thermoplastic layer, the surface of the fabric opposite the first surface being attached to a layer of rigid foam having a specific volume in the range of 3 to 30 cm³/gram and a thickness of at least 2.5 cm and the fabric layer being a nonwoven fabric stitchbonded with elastic threads, or a needled felt or a knitted fabric.

2. A shaped article in accordance with claim 1 wherein the composite sheet is made with a fabric layer having a specific volume of at least 5 cm³/gram, a weight in the range of 100 to 500 g/m² and a conformability at 180° C. in the range of 2 to 9, the composite sheet is thermoformed with an expansion factor of at least 2.0, the fabric layer is a nonwoven fabric stitchbonded with elastic threads and the foam is generated in-situ.

3. A shaped article in accordance with claim 2 wherein, the thermoplastic polymer is of a methylmethacrylate homopolymer or copolymer and the foam is of polyurethane polymer.

4. A shaped article in accordance with claim 3 wherein the expansion factor is in the range of 3 to 6, the conformability is in the range of 4 to 7 and the fabric weight is in the range of 5 to 15% of the total weight of the composite sheet.

* * * * *